$$\frac{1}{a+d} + \frac{1}{b} = \frac{1}{f}$$

$$\frac{1}{a} + \frac{1}{b+c} = \frac{1}{f}$$

$$eb = (d+a)g$$

INVENTORS.
FRIEDRICH DINHOBEL
BY JOHN R. SHOEMAKER
[signature]
ATTORNEY

INVENTORS.
FRIEDRICH DINHOBEL
JOHN R. SHOEMAKER
BY [signature]
ATTORNEY 3,306,160
MULTI-PURPOSE PHOTO SENSOR Friedrich Dinhobel, University City, Mo., and John R. Shoemaker, Akron, Ohio, assignors to Goodyear Aerospace Corporation, Akron, Ohio, a corporation of Delaware Filed Sept. 24, 1964, Ser. No. 399,002
8 Claims. (Cl. 88—24)

This invention relates to a multi-purpose sensor, and more particularly to a photosensitive readout device which does away with the requirement for electron beam readout, which sensor has the capacity to store an optical image as an electron pattern, and which sensor affords greater signal levels and greatly increased resolution capabilities.

Present television camera tubes with continuous photosensitive surfaces are limited in resolution by the finite dimensions of the reading electron beam and the level of signal produced at each picture element by the charge pattern rather than the inherent graininess of the photosensitive element. As the size of the resolvable element is reduced, there is a corresponding reduction in the magnitude of the associated electrical charge and hence signal energy. Since present tubes are operated under conditions where amplifier noise is appreciable compared to signal level, any increase in resolution is limited by signal to noise considerations.

A photosensitive device which eliminates the necessity for electron beam readout is not presently available in the art. This type of device would provide an improved apparatus for a plurality of applications such as a television camera device, an image intensifier, a correlation device, a scan convertor, and a contrast enhancer. Further, a photo sensor which can store an image for a nondestructive readout without the use of an electron beam is not known in the art.

It is the general object of the present invention to meet the needs of the art by providing a photosensitive device which utilizes the fundamental construction of a capacitor to define an optical image input as variations in the electrical field as a function of the dielectric constant separating the electrodes of the capacitor.

A further object of the invention is to provide a photo sensor which utilizes a photoconductor element positioned between two conductive elements acting as a capacitor so that the resistivity of the photo-conductive element may be varied as a function of the illumination thereon to provide an electrical field in the capacitor with a distortion pattern corresponding to the optical pattern on the photoconductor.

A further object of the invention is to provide a photosensitive device which dispenses with the requirement for electron beam readout and which further affords greater signal levels, and increased resolution capabilities.

A further object of the invention is to provide a photosensitive element where an input optical image is stored by a capacitance effect and which can be read out as an optical image on a display screen by utilizing a Schlieren optical system.

The aforesaid objects of the invention and other objects will become apparent as the description proceeds are achieved by providing in a multi-purpose photo sensor the combination of a transparent support medium, a transparent conductive layer on one side thereof serving as an electrode, a reflector conductive layer positioned in spaced parallel relation from the transparent conductive layer serving as another electrode, a dielectric photoconductive layer operatively affixed to and covering the transparent conductive layer to act as a dielectric and/or shunt resistor, a dielectric mesh separating the photoconductive layer from the reflective conductive layer to break the field between the transparent conductive layer and the reflective conductive layer into a plurality of individual capacitors, means to place a voltage potential between the transparent conductive layer and the reflective conductive layer, and means to project an optical light image onto the photoconductive layer through the support medium to create an electron image stored as variable electrical charges in the plurality of capacitors between the transparent conductive layer and the reflective conductive layer.

For a better understanding of the invention reference should be had to the accompanying drawings wherein.

Figure 1:
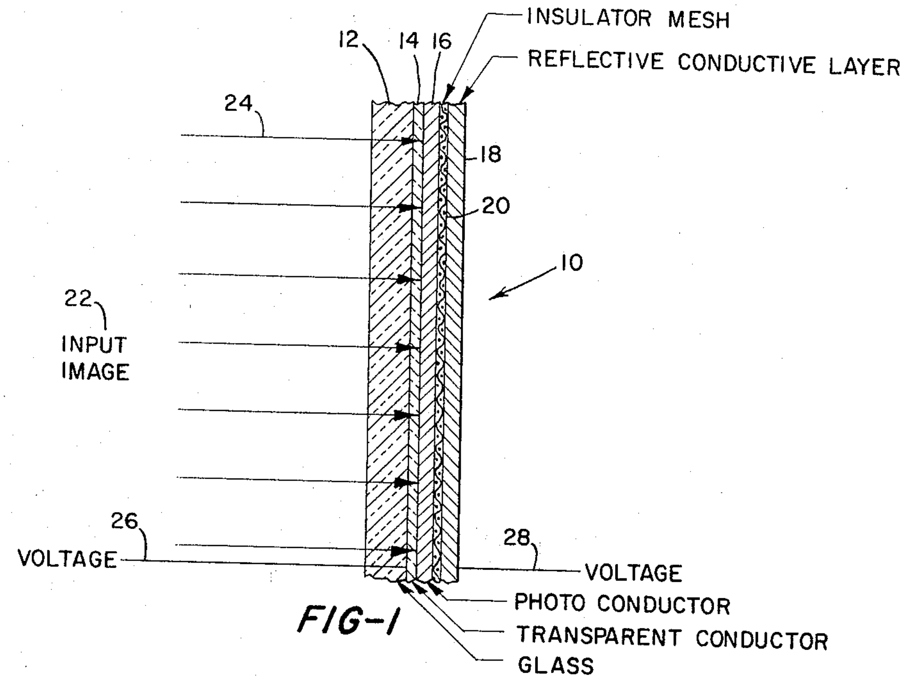
FIGURE 1 is a broken away cross sectional view of a laminate structure defining one embodiment of the photo sensor of the invention.

With reference to the form of the invention illustrated in FIGURE 1 of the drawings, the numeral 10 indicates generally a photo sensor element comprising a glass substrata or transparent support medium 12 having a transparent conductive layer 14 covering the face thereof with a photoconductor layer 16 operatively positioned in adjacent relationship and secured to the transparent conductor layer 14. A reflective conductor layer 18 is operatively separated from the photoconductor layer 16 by means of a dielectric insulator mesh 20. The operation of the photo sensor, as more fully described hereinafter, contemplates the passage of an optical input image 22 through the glass support medium 12 in a direction indicated generally by the arrows 24.

The operation of the photo sensor element 10 may be visualized by considering the transparent conductor layer 14 and the reflective conductor layer 18 as electrodes of a capacitor separated by a structure consisting of at least two different dielectrics, namely the air gap created by the insulator mesh 20 and the photoconductor layer 16. Since the insulator mesh 20 actually resembles a screen or grid having a plurality of equally sized openings therethrough, the capacitor could be considered as a conglomerate of many elemental capacitors having the size of the mesh element openings of the insulator spacer mesh 20. Since the photoconductor 16 also acts as a shunt resistor, the apparent capacitance of each of these elemental capacitors is a function of the illumination pattern on the photoconductor 16.

In order to achieve the objects of the capacitance between the transparent conductor layer 14 and the reflective conductor layer 18 it is anticipated that an electrical field will be applied by voltages impressed therebetween through line 26 connected to the transparent conductor layer 14 and the line 28 connected to the reflective conductor layer 18. With the electrical field applied to the plurality of capacitors, it causes an attraction between the electrodes proportionate to the square of the electric field adjacent to the reflective layer 18. Since for a given geometry of the electrodes and a given applied voltage, the electrical field varies as function of the dielectric constant created by the air gap created by the insulator mesh 20 and the photoconductor layer 16, separating the electrodes, and since a shunt resistance across a portion of the dielectric as applied by the photoconductor layer 16, changes the dielectric constant, the stress imposed on the individual capacitor elements will vary as a function of the illumination on the respective portions of the photoconductor layer 16. If now one electrode of these elemental capacitors acts as a membrane resting on a grid structure, the varying field will result in a distortion pattern corresponding to the optical pattern on the photoconductor. It is anticipated that the reflective conductor layer 18 will be slightly elastic and flexible. Thus, although FIGURE 1 shows the face of the reflective conductor layer 18 as being flat, it will actually take on a plurality of depressions as defined by the insulator mesh 20, as more particularly determined by the capacitance generated in each individual capacitor element because of the light pattern falling on the photoconductor 16.

Figure 2:
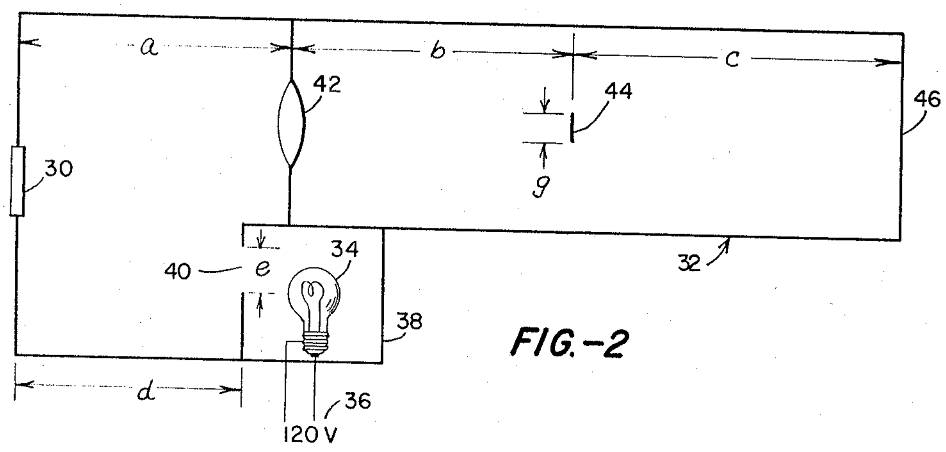
FIGURE 2 is a schematic illustration of an optical readout utilizing the photo sensor of FIGURE 1.

In order to utilize an image stored on the photosensor element 10, it may be incorporated with a Schlieren optical system, as more fully illustrated in FIGURE 2. Here a photo sensor element 30 is mounted within a housing, indicated generally by numeral 32, where a light source 34 supplied by a voltage source 36 and contained within a separate housing 38, is designed to project a light through an aperture 40 to substantially fully cover the exposed surface of the photo sensor element 30. The photo sensor element 30 is positioned with the reflective conductor layer to the inside of the housing 32 so that the light-reflected thereof is projected back through a lens 42, around a light stop 44, and onto an image viewing screen or photo detector 46. Of course, the focal lengths of the lens 42 and the position of the apertures 40 and 44 will have to be properly controlled so as to provide an accurate reflected image of the image stored in the photo sensor element 30 onto the screen 46. The letter distance designations and formula relationships indicated in FIGURE 2 illustrate a proper focus condition.

Figure 3:
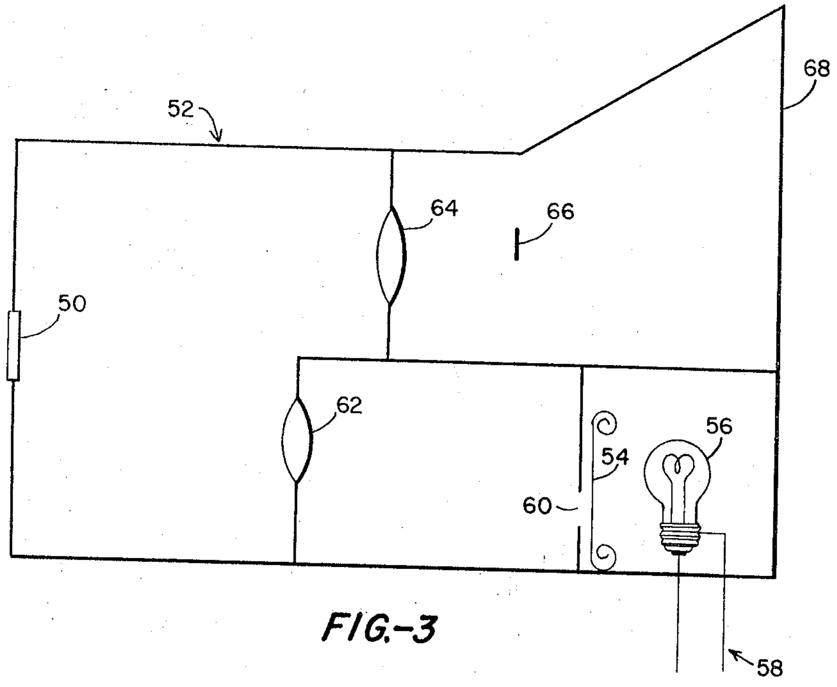
FIGURE 3 is a schematic illustration of how to use the photo sensor of FIGURE 1 to effect a correlation function.

An apparatus to perform a correlation function utilizing a photo sensor element is shown in FIGURE 3. In this embodiment of the invention, a photo sensor element 50 is operatively mounted in a body or housing indicated generally by numeral 52. A negative 54 is projected by a light 56 supplied by a voltage source 58 through an aperture 60, a leans 62 and onto the surface of the photo sensor element 50. This image projected is then reflected along with the image stored on the photo sensor element 50 through a lens 64 onto a light stop 66, to be focused onto an image viewing screen or photo detector 68. Thus, the superimposed images, namely the image stored on the negative 54 and the image stored on the photo sensor element 50, can be read by any suitable apparatus in their superimposed form on the viewing screen 68 in order to determine correlation. Again, the dimensions and focal lengths for the lenses 62 and 64 must be determined with relation to the apertures 60 and 66 in order to achieve a proper superimposition of the images onto the viewing screen 68.

Figure 4:
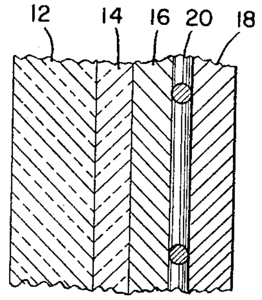
FIGURE 4 is an enlarged broken away cross sectional view of the photo sensor element of FIGURE 1.

FIGURE 4 illustrates what might properly be called one of the elemental capacitors, as described above. In any event, this elemental capacitor consist of the transparent support medium 12, generally made from glass, and having a thickness of between about .010 to about .050 inch. The transparent conductive layer may be made from any suitable transparent conductive material, for example, an evaporated layer of aluminum having a thickness in the neighborhood of 50 angstroms, but which thickness may very between about 25 angstroms and about 150 angstroms so as to achieve a conductivity of between about 2,000 to about 3,000 ohms per square.

The photoconductor layer 16 may be made from any suitable light sensitive material such as cadmium sulfide which is used generally in exposure meters. The cadmium sulfide may be ground and deposited to provide a layer about .010 in thickness, but which thickness may vary appreciably, although the thinner the layer, the better the resolution of the element.

The insulator mesh 20 is what actually determines the size of the capacitor element. Any suitable dielectric mesh may be utilized. The invention contemplates possibly the use of photo etching to form the mesh but having the grid spacing or spacing between adjacent ribs 20*a* being between about .004 to about .020 inch. Again, the purpose of the mesh 20 is to separate the photo conductive layer 16 from the reflective conductor layer 18 so that the reflective conductive layer 18 which is elastic, resilient and deformable may be deformed by the electrical charge developed in the capacitor element. Again, resolution of the stored images is dependent upon the thickness of the mesh.

The reflective conductive coating 18 may be formed from a thin aluminum film generally opaque for reflective purposes and having a thickness of about 1,000 angstroms. This reflective mirror may be formed by providing a cellulose nitrate as a membrane or substrate with the aluminum deposited on the cellulose nitrate. The reflective conductive layer 18 is then placed in contact with the mesh 20.

In order to achieve the proper capacitance effects between the transparent conductive layer 14 and the reflective conductive layer 18 acting as the two electrodes of the capacitor, it is anticipated that voltages of between about 2 to about 10 volts may be applied. This makes each capacitor element with the lossy dielectrics of the photo-conductor layer 16 and the mesh layer 20 therebetween create slight identations on the layer 16 as determined by the particular activation by the light image falling thereon.

As an important element of the invention, it should be understood that the reflective conducting layer 18 must actually be elastic and deformable, such as a thin evaporated aluminum will provide, so that it may be formed into the plurality of small indentations by the capacitance voltage which are necessary to achieve the replica of the image projected on the photoconductive layer 16 and return to a normal surface when the voltages are removed. The voltage applied to produce the capacitance effect should be D.C. when a stored image is desired, whereas A.C. voltage should be used for non-storage applications.

Applications of the photo sensor may be as follows:

(1) *Application as a television camera tube.*—In this application a scene is brought to focus upon the photoconductor and an A.C. voltage with cyclic period shorter than the time constant of the photoconductor, is applied between the electrodes. The reflective coating is scanned with a focused light beam in television raster fashion through a Schlieren optical set-up. Light passing the light stop is converted into an electrical signal by a photomultiplier, thus giving a time dissected video train as in a conventional TV pickup tube.

(2) *Application as an image intensifier.*—In this application, the reflective film is not scanned with a light beam but the whole area is illuminated simultaneously. The aperture of the Schlieren system is focused onto the appropriate light stop and the reflective film is focused onto the viewing screen.

(3) *Application as a correlator* (FIGURE 3).—If a reference transparency is back-lit and used as the light source for the Schlieren system and two focus conditions fulfilled, that is, the transparency brought into focus on the reflective film and the Schlieren aperture brought into focus onto the light stop, the total amount of light passing the light and detected by a photo detector will be proportionate to the product of the scene on the reflective film and that on the reference transparency. This then satisfies the requirements of a correlator.

(4) *Application as a scan convertor.*—If a scene is written into the photo sensor using a scanning light beam at one frame rate and detected by a reading light beam at a different scan frame rate, the device can function as a scan convertor. In this application, the time constant of the photoconductor would have to be matched to the write cycle.

(5) *Application as a contrast enhancer.*—If the spacer screen and reflective film are replaced by a uniform elastic film with reflective coating, it may be shown that diffentiation of the scene is accomplished. If used in this fashion then, in the manner described for either a television camera tube or an image intensifier, an edge enhanced picture would be reproduced.

(6) *Application as an electrical readout or display storage device.*—If a D.C. potential is applied to the electrodes during the write cycle, rather than A.C., as described under the application 1 or 2 above, the scene is stored and remains until the photoconductor is exposed to a light flash under a condition of shorted electrodes. In this condition the stored image may be either displayed in the manner described for the image intensifier or dissected by electrical readout in the same manner described for a television camera tube. The readout would be completely non-destructive.

Thus, it is seen that the objects of the invention have been achieved by providing a multi-purpose photo sensor element together with certain typical applications. The element is made by providing the two conductive layers, one transparent and one a reflective coating to serve as electrodes with a photoconductive layer and a mesh of insulating material acting as a spacer positioned between the electrodes. A voltage is supplied between the electrodes and an image is stored as indentations on the reflective conductive coating in accordance with capacitance voltages controlled by the shunt resistance of the photoconductive layer. A Schlieren optical system may be utilized to read out the stored image with many various possibilites, as described above.

While in accordance with the patent statutes only one best known embodiment of the invention has been illustrated and described in detail, but it is to be understood that the invention is not limited thereto or thereby, but that the inventive scope is defined in the appended claims.

What is claimed is:

1. In a multi-purpose photo sensor the combination of
a transparent support medium,
a transparent conductive layer thereon serving as an electrode,
a dielectric photoconductive layer operatively affixed to and covering the conductive layer acting as a shunt resistor,
a dielectric mesh of transparent insulating material operatively affixed to and covering the photoconductive layer to act as a support and a spacer,
an elastic photoreflective conductive film operatively affixed to and covering the mesh positively separated from said photoconductive layer,
means to project an optical light image onto the transparent support medium to activate the photoconductive layer,
means to apply an electrical field between the transparent conductive layer and the photoreflective conductive film,
means to project light through the transparent support medium for reflection off the reflective conductive film, and
a viewing screen to receive the reflection of the light from the reflective conductive film.

2. In a multi-purpose photo sensor the combination of
a transparent support medium,
a transparent conductive layer on one side thereof serving as an electrode,
a reflective conductive layer positioned in spaced parallel relation from said transparent conductive layer,
a dielectric photoconductive layer operatively affixed to and covering the transparent conductive layer to act as a shunt resistor,
a dielectric mesh separating the photoconductive layer from and supporting the reflective conductive layer,
means to place a voltage potential between the transparent conductive layer and the reflective conductive layer to create a capacitance voltage charge therebetween, and
means to project an optical light image onto the photoconductive layer through the support medium to variably control the capacitance charge between the transparent conductive layer and the reflective conductive layer as a function of the illumination pattern projected on the photoconductive layer.

3. In a multi-purpose photo sensor the combination of
a transparent support medium,
a transparent conductive layer on one side thereof serving as an electrode,
a reflective conductive layer positioned in spaced parallel relation from said transparent conductive layer,
a dielectric photoconductive layer operatively affixed to and covering the transparent conductive layer to act as a shunt resistor,
a dielectric mesh separating and supporting the photoconductive layer from the reflective conductive layer,
means to place a voltage potential between the transparent conductive layer and the reflective conductive layer, and
means to project an optical light image onto the photoconductive layer through the support medium to create an electron image thereof stored as indentations on the mesh unsupported portions of the reflective conductive layer because of capacitance charges between the transparent conductive layer and the reflective conductive layer, and controlled as a function of the illumination of the photoconductive layer.

4. In combination
a transparent support medium,
a transparent conductive layer on one side thereof serving as an electrode,
a reflective conductive layer positioned in spaced parallel relation from said transparent conductive layer,
a dielectric photoconductive layer operatively affixed to and covering the transparent conductive layer to act as a shunt resistor,
a dielectric mesh separating the photoconductive layer from and supporting the reflective conductive layer,
means to place a voltage potential between the transparent conductive layer and the reflective conductive layer,
means to project an optical light image onto the photoconductive layer through the support medium to create an electron image thereof stored as indentations on the mesh unsupported portions of the reflective conductive layer because of capacitance charges between the transparent conductive layer and the reflective conductive layer, and controlled as a function of the illumination of the photoconductive layer,
a viewing screen, and
means to project as an image the indentations on the reflective conductive layer onto the viewing screen.

5. In combination
a transparent support medium,
a transparent conductive layer on one side thereof serving as an electrode,
a reflective conductive layer positioned in spaced parallel relation from said transparent conductive layer,
a dielectric photoconductive layer operatively affixed to and covering the transparent conductive layer to act as a shunt resistor,
a dielectric mesh defining small regular geometric shapes separating the photoconductive layer from the reflective conductive layer,
means to place a voltage potential between the transparent conductive layer and the reflective conductive layer,
means to project an optical light image onto the photoconductive layer through the support medium to create an electron image stored as indentations on the mesh unsupported portions of the reflective conductive layer because of capacitance charges between the transparent conductive layer and the reflective conductive layer,
a viewing screen, and
means to project a negative film image onto the reflective conductive layer which is reflected in superimposition with the electron image onto the viewing screen for a correlation function.

6. In combination
a photo sensor element comprising
- a transparent support medium,
- a transparent conductive layer positioned on one side of the medium,
- a dielectric light sensitive layer having properties to act as a shunt resistor positioned on the transparent conductive layer,
- a dielectric mesh forming small squares of between .004 to .020 inch in width positioned on the light sensitive layer, and
- an elastic and deformable reflective conductive layer in contact with and supported by the mesh to be thereby held separate from the light sensitive layer, means to place a voltage between the transparent conductive layer and the reflective conductive layer of sufficient force to cause measurable deflection to the reflective conductive layer toward the transparent conductive layer, and means to project an optical light image onto the light sensitive layer through the support medium so the voltage between the conductive layers is controllable as a function of the illumination on the light sensitive layer which controls the deflection of the reflective conductive layer to simulate the light image.

7. A combination as called for in claim 6 which includes a viewing screen, and means to project light onto the reflective conductive layer where the light reflected off the reflective conductive layer is focused onto the viewing screen to accurately depict the light image projected onto the light sensitive layer.

8. A combination as called for in claim 6 which includes a viewing screen, and means to project a reference optical light image onto the reflective conductive layer where the light reflected off the reflective conductive layer is a superimposition of the reference optical light image and the light image projected onto the light sensitive layer, and where the light reflected off the reflective conductive layer is focused onto the viewing screen.

References Cited by the Examiner

UNITED STATES PATENTS

| | | | |
|---|---|---|---|
| 3,085,051 | 4/1963 | Hamm et al. | 204—18 |
| 3,137,762 | 6/1964 | Baumgartner et al. | 88—61 |

NORTON ANSHER, *Primary Examiner.*

R. A. WINTERCORN, *Assistant Examiner.*